United States Patent
Nunez et al.

(10) Patent No.: US 8,018,805 B2
(45) Date of Patent: Sep. 13, 2011

(54) MEDIA TYPE DETECTION USING A LOCK INDICATOR

(75) Inventors: Jorge Licona Nunez, Santa Clara, CA (US); Ju Hi Hong, San Jose, CA (US); Ting Zhou, Alameda, CA (US); I-Scheng Chuang, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 869 days.

(21) Appl. No.: 11/314,883

(22) Filed: Dec. 21, 2005

(65) Prior Publication Data

US 2007/0140074 A1    Jun. 21, 2007

(51) Int. Cl.
*G11B 5/55* (2006.01)
*G11B 7/00* (2006.01)

(52) U.S. Cl. .................................. 369/53.23; 369/44.26
(58) Field of Classification Search ............... 369/53.23, 369/44.26
See application file for complete search history.

(56) References Cited

U.S. PATENT DOCUMENTS

| | | | | |
|---|---|---|---|---|
| 4,680,594 A * | 7/1987 | Bracht | ..................... | 369/53.36 |
| 5,764,610 A * | 6/1998 | Yoshida et al. | ............ | 369/53.22 |
| 5,959,942 A * | 9/1999 | Taguchi et al. | ............ | 369/13.24 |
| 6,747,922 B2 * | 6/2004 | Kamiyama | ............... | 369/44.28 |
| 6,822,936 B2 * | 11/2004 | Ono et al. | .................. | 369/53.23 |
| 6,850,473 B1 * | 2/2005 | Toyota | ..................... | 369/53.24 |
| 2004/0264313 A1 * | 12/2004 | Nagara et al. | ............. | 369/44.32 |
| 2005/0047300 A1 * | 3/2005 | Ono et al. | ................. | 369/53.23 |
| 2005/0146997 A1 * | 7/2005 | Mahr | ....................... | 369/30.33 |

* cited by examiner

*Primary Examiner* — Craig A. Renner
*Assistant Examiner* — Aneeta Yodichkas
(74) *Attorney, Agent, or Firm* — Christopher P. Maiorana, PC

(57) ABSTRACT

A method for detecting a media type of an optical disc system comprising the steps of (A) checking for a first wobble signal associated with a first media type, (B) if step (A) detects the first wobble signal, operating the optical disc system as the first media type, (C) checking for a second wobble signal associated with a second media type, and (D) if step (C) detects the second wobble signal, operating the optical disc system as the second media type.

21 Claims, 4 Drawing Sheets

MEDIA TYPE DETECTION USING A LOCK INDICATOR

FIELD OF THE INVENTION

The present invention relates to media detection generally and, more particularly, to a method and/or apparatus for implementing media type detection using a lock indicator.

BACKGROUND OF THE INVENTION

Conventional systems determine a disc type by reading the lead-in area in the disc (or by determining if a lead-in area is present or not), to select whether a DVD+R/RW, DVD-ROM or DVD-R/RW is being read. Such a process can be slow. Such a process finds the region containing the lead-in area, determines if data is present in the lead-in area and then reads and decodes data in the lead-in area to determine the disc type.

It would be desirable to provide a fast and reliable approach that would provide performance gains by making it easier to navigate through a disc towards the lead-in area. In particular, it would be desirable to implement an approach that would be location independent to work independently of where on the disc the head spins up.

SUMMARY OF THE INVENTION

The present invention concerns a method for detecting a media type of an optical disc system comprising the steps of (A) checking for a first wobble signal associated with a first media type, (B) if step (A) detects the first wobble signal, operating the optical disc system as the first media type, (C) checking for a second wobble signal associated with a second media type, and (D) if step (C) detects the second wobble signal, operating the optical disc system as the second media type.

The objects, features and advantages of the present invention include providing a method and/or apparatus that may (i) detect a media type in response to a lock indication, (ii) compare a wobble signal with known wobble signals and/or (iii) determine a media type in response to a known wobble signal.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide a fast, efficient and/or reliable process to determine a particular media type being used in an optical disc system. In one example, the present invention may be used during the spinup process of an optical disc system. Once the particular disc type is known, navigation on the disc and/or maintaining track lock may be simplified. If a wobble channel is present, then the wobble channel may be used to find the current location of the head on the disc.

A wobble lock indicator system (or circuit, to be described in connection with FIGS. 2-4) may be used, in one example, to determine whether the media being used is a DVD+, DVD- or DVD-ROM. While particular DVD applications have been described, other applications such as DVD-RAM, CD-R, CD-RW, etc. may also be determined with the present invention. In one example, the lock indicator system may include a phase locked loop (PLL). A method (or process) may be used to determine the media type in response to an existing wobble PLL Lock indicator signal.

Figure 1:
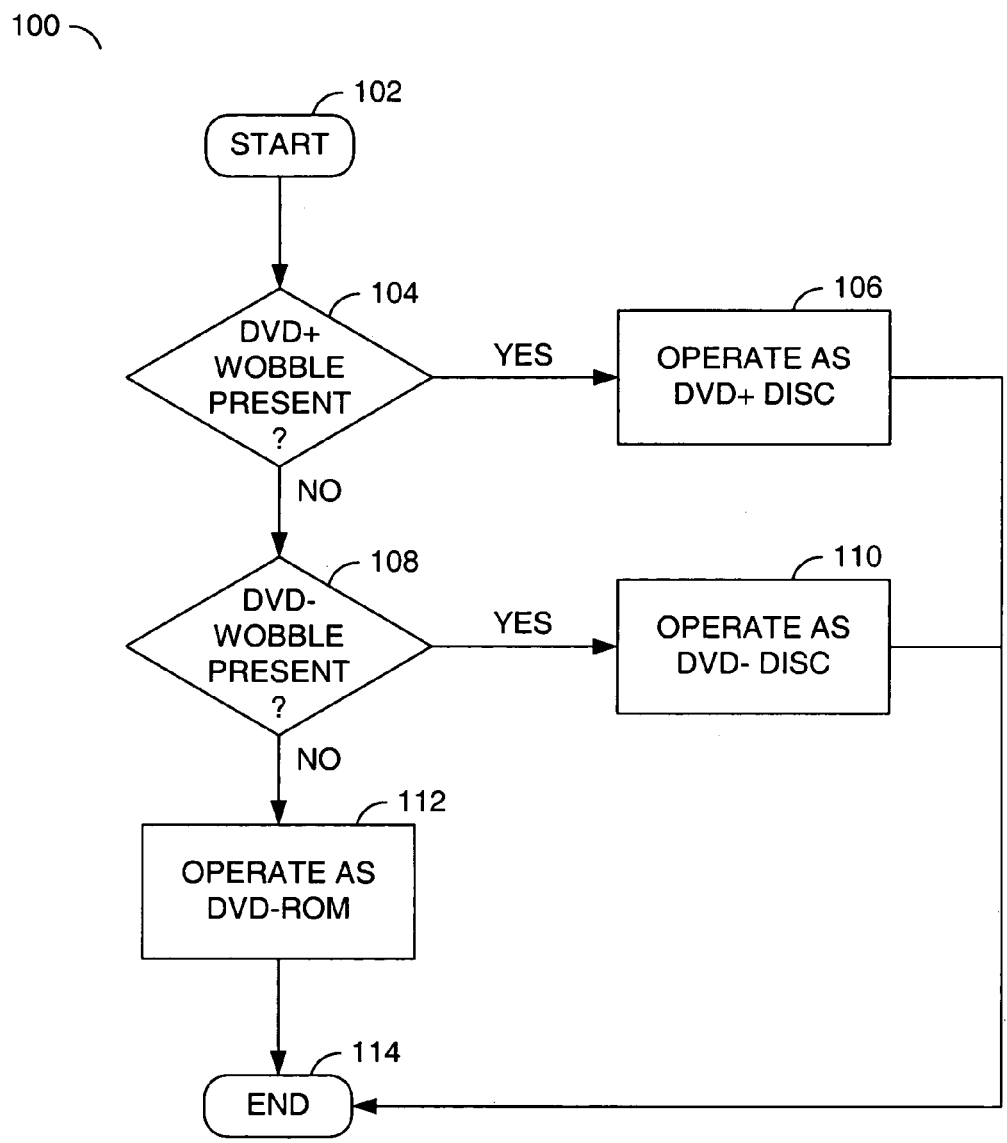
FIG. 1 is a flow diagram of the present invention.

Referring to FIG. 1, a process 100 is shown in accordance with the present invention. The process 100 generally comprises a start state (or step) 102, a decision state (or step) 104, a state (or step) 106, a decision state (or step) 108, a state (or step) 110, a state (or step) 112 and an end state (or step) 114. The state 102 may be a start state. The decision state 104 generally checks for the presence of a DVD+ wobble. If so, the method 100 moves to the state 106. If not, the method 100 moves to the decision state 108. The state 106 operates the system as a DVD+ disc. The decision state 108 checks for the presence of a DVD- wobble. If so, the method 100 moves to the state 110. If not, the method 100 moves to the state 112. The state 110 operates as a DVD- disc. The state 112 operates as a DVD-ROM disc. After the states 106, 110 and 112, the method 100 ends at the state 114.

While the method 100 starts by checking for the presence of a DVD+ wobble lock (e.g., the state 104), a DVD- wobble check (e.g., the state 108) may be implemented first. In particular, the particular order of which media type is checked first may be varied to meet the design criteria of a particular implementation. The state 104 and the state 108 do not normally need to decode a wobble address, but rather determine if the appropriate wobble signal is present. In general, the detection of the presence of a wobble signal may be accomplished faster than decoding a particular wobble address. Therefore, the method 100 may effectively determine the disc type with the detection of the presence of an appropriate wobble signal.

In general, the step 104 checks for the presence of a DVD+ wobble signal. The step 104 may be implemented by checking the status of a PLL Lock indicator circuit (to be described in connection with FIGS. 2-4) after a predetermined time. In general, a DVD+ wobble signal may be detected in approximately 2 ms, while a DVD- wobble signal may be detected in approximately 1 ms. The overall method 100 may provide an indication in approximately 3 ms. However, additional time may be used in certain applications. For example, 3-5 ms may be used to provide a proper lock signal. In certain implementations, more than 5 ms may be used. For robustness, the status may be sampled several times, with a majority logic decision used to provide a lock status. If the logic 100 detects the PLL is locked to a DVD+ wobble, the disc may be identified as a DVD+ disc.

The step 108 checks for the presence of a DVD- wobble signal. The step 108 may be implemented by checking the status of a PLL Lock indicator circuit after a predetermined time. Similar to the step 104, a majority logic circuit may be used or a signal sample may be taken to make the decision. If the logic 100 detects the PLL is locked to a DVD- wobble, the disc may then be identified as a DVD- disc. If the state 104 and the state 108 do not detect the presence of a + or – wobble, the disc may be identified, in one example, as a DVD-ROM disc. In another example, if the state 104 and the state 108 do not detect the presence of a + or – wobble, the disc may be identified as "not known" or otherwise not readable. Also, while DVD+ and DVD− media types have been described, other media types may be detected with the present invention.

One advantage of the method 100 is the speed in obtaining a lock. Another advantage is the location independence of when an initial read occurs. In general, there is no need to be in any specific location of the disc (other than one where the wobble would be present) to determine the media type. The method 100 provides a fast lock since there is no need to read any memory addresses to determine if a disc is locked. The only determination is whether the PLL is locked at a valid frequency or not. A valid frequency may be the wobble frequency of a particular media type, or a multiple of the wobble frequency of a particular media type.

Therefore the overall process 100 is achieved in preferably 1-100 milliseconds, more preferably from 2-10 milliseconds, most preferably from 2-3 milliseconds.

Figure 2:
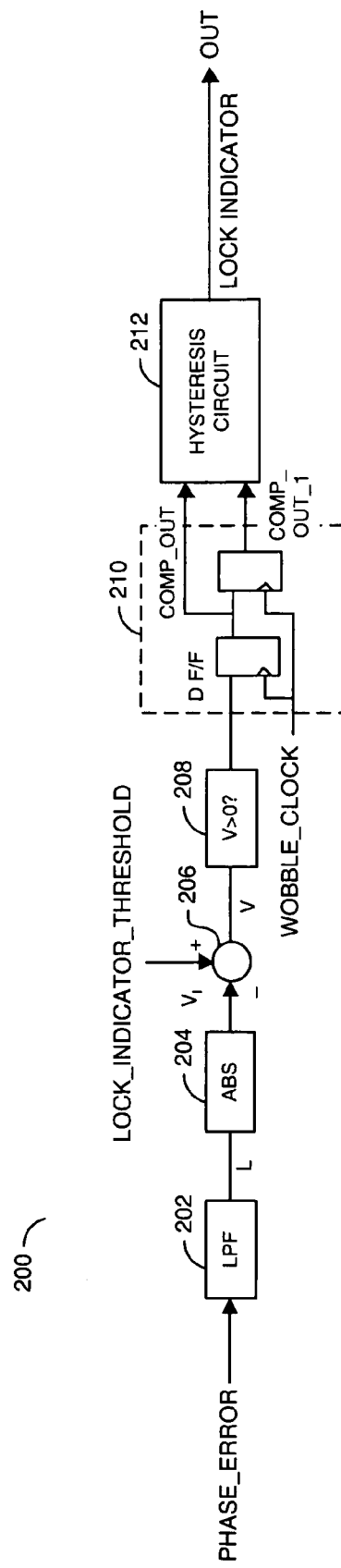
FIG. 2 is a block diagram of a lock indicator circuit.

Referring to FIG. 2, a wobble indication circuit 200 is shown. The circuit 200 may be implemented as a wobble lock indicator circuit. The circuit 200 illustrates one implementation of the present invention. However, other circuits may be implemented accordingly to meet the design criteria of a particular implementation. In general, the present invention may be used with any circuit to detect the presence of a wobble channel as a basis for selecting an appropriate media type. In general, the circuit 200 may be implemented as a loss of lock indicator circuit (e.g., a signal OUT may be active when a lock is not present). However, a circuit that indicates when a lock is present may also be implemented.

The circuit 200 generally comprises a block (or circuit) 202, a block (or circuit) 204, a block (or circuit) 206, a block (or circuit) 208, a block (or circuit) 210 and a block (or circuit) 212. The circuit 202 may be implemented as a low pass filter circuit. The circuit 204 may be implemented as an absolute value circuit. The circuit 206 may be implemented as a threshold circuit. The circuit 208 may be implemented as a decision circuit. The circuit 210 may be implemented as a compare signal generation circuit. The circuit 212 may be implemented as a hysteresis circuit.

The wobble PLL lock indicator circuit 200 receives a signal (e.g., PHASE_ERROR) of a phase locked loop (PLL) within an optical disc system. The circuit 212 generates a lock indicator signal (e.g., OUT). The circuit 200 may be used to determine whether the PLL is either locked or not locked. For added robustness, a frequency detection circuit (to be described in more detail in connection with FIG. 4) may be incorporated into the circuit 200. When combined with FIG. 4, the lock indicator circuit 200 turns on if the additional constraint that a valid frequency is detected. Therefore, if the signal PHASE_ERROR is low, but the frequency is far from the expected frequency (to be described in more detail in connection with FIG. 5), the circuit 200 does not consider the PLL to be locked. In such a case, the lock indicator signal OUT would not transition to the locked (high) state. The settings for the circuit 200 may be either fixed settings, or may be programmable so that different values may be used for determining the presence of a DVD+ or a DVD− wobble signal.

The low pass filter 202 may be used to generate a signal (e.g., L) in response to the signal PHASE_ERROR. The absolute value circuit 204 may be used to generate a signal (e.g., V1). The lowpass filtered phase error is compared to the programmable threshold voltage to make lock or unlock decision. The circuit 210 normally operates at the wobble frequency (e.g., in response to a signal WOBBLE_CLOCK). In one example, the frequency response of the lowpass filter 202 may be programmable. However, a non-programmable low-pass filter may be implemented to meet the design criteria of a particular implementation. In one example, the frequency response of the circuit 202 may be closely approximated by a second order Butterworth filter with the 3 dB frequency equal to 0.2% of the wobble frequency. The tracking bandwidth of the PLL may also be set typically close to 0.2% of the wobble frequency.

Figure 3:
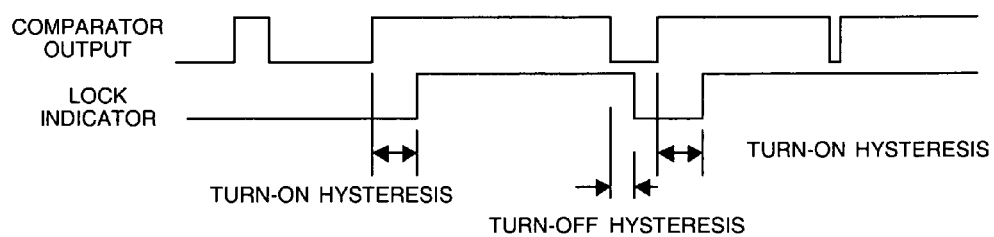
FIG. 3 is a timing diagram of an example of a hysteresis circuit.

Referring to FIG. 3, a diagram illustrating operation of the hysteresis circuit 212 is shown. The hysteresis circuit 212 may be used to eliminate flickering (or glitching) on the lock indicator output, especially when the threshold voltage is set too aggressively. The hysteresis circuit 212 may be used to ignore short glitches at the output of the threshold detector. The hysteresis circuit 212 may filter potential glitches from both (i) the locked state from unlocked state and (ii) the unlocked state from locked state transitions with independently programmable hysteresis. Possible applications of the wobble PLL lock indicator circuit 200 include the differentiation of the ROM and writeable media and write inhibit generation for DVD− media, since wobble address decode is not very reliable during a write operation.

Figure 4:
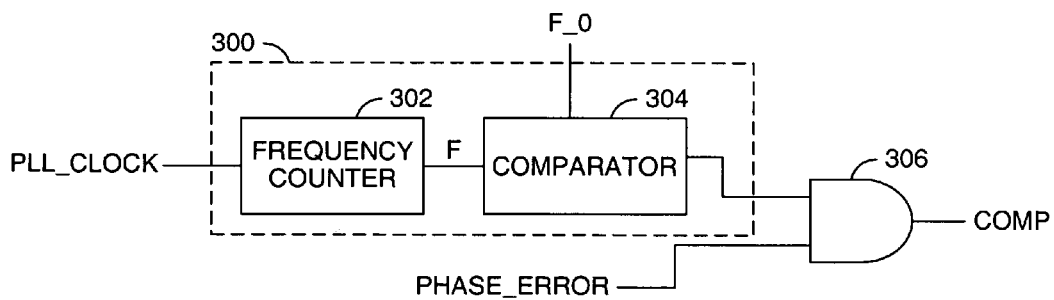
FIG. 4 is a diagram of a frequency counter circuit.

Referring to FIG. 4, a diagram of a frequency counter circuit 300 is shown. The circuit 300 may be implemented as a frequency counter circuit. The circuit 300 generally comprises a block (or circuit) 302, a block (or circuit) 304, and a block (or circuit) 306. The circuit 302 may be implemented as a frequency counter circuit. The circuit 304 may be implemented as a comparator circuit. The circuit 306 may be implemented as a gate circuit. In one example, the gate circuit 306 may be implemented as a AND gate. However, other gates may be implemented to meet the design criteria of a particular implementation. The circuit 300 may be used to prevent false lock situations. The lock indicator may be implemented as a frequency counter. When the wobble PLL is locked, the phase error should to be low, but the frequency needs to be the correct frequency. The output of the circuit 300 may be gated with the output of the frequency detection circuit 200 with the gate 306 to generate a signal (e.g., COMP). The signal COMP normally goes high, indicating a lock, if both (i) the frequency is correct and (ii) the phase error is low.

The circuit 304 is shown receiving a signal F_0 and a signal F. The signal F_0 may be implemented as a start up frequency. In one example, the signal F_0 may be 63 MHZ, which may be an initial oscillation frequency to start the PLL. The particular frequency of the signal F_0 may be varied to meet the design criteria of a particular implementation by adjusting to compensate for the read or write speed being used on a particular system. The block 302 counts the frequency of the signal PLL_CLOCK and generates the signal F. The signal F_0 is normally the approximate expected frequency of the signal PLL_CLOCK. The block 304 checks that the frequency of the signal F is close to the frequency of the signal F_0. Such comparison may be implemented as:

$$|F-F\_0|<1\ \text{MHZ}.$$

In such an example the output of the circuit 300 would indicate a lock if the difference between the signal F and the F_0 is less than 1 MHZ.

Figure 5:
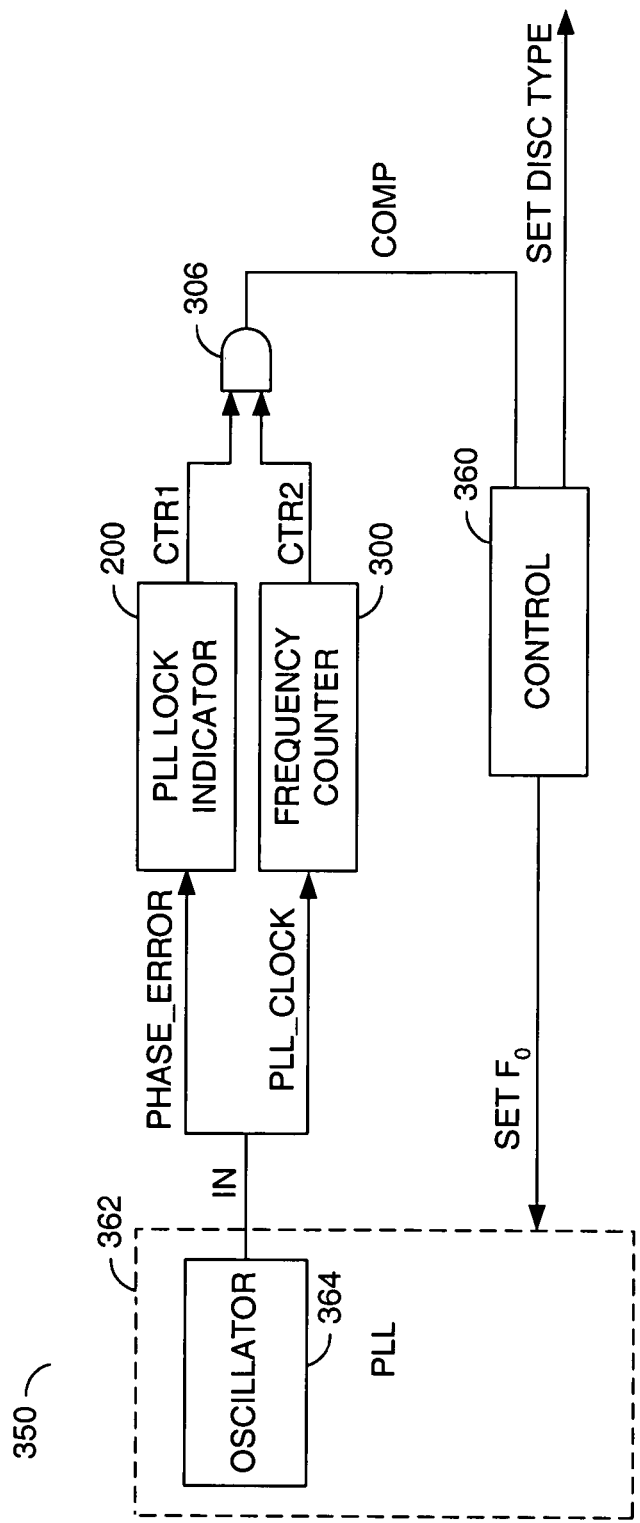
FIG. 5 is a diagram illustrating an implementation of the present invention.

Referring to FIG. 5, a diagram of the circuit 304 is shown illustrating an implementation of the present invention. The circuit 350 generally comprises a block (or circuit) 352, the block (or circuit) 200, the block (or circuit) 300, the gate 306, a block (or circuit) 360, and a block (or circuit) 362. The circuit 362 may be implemented as a phase lock loop lock indicator circuit. The circuit 362 may include an oscillator 364. The oscillator may be implemented as a voltage controlled oscillator (VCO), a numerically controlled oscillator, or other oscillator to meet the design criteria of a particular implementation. The circuit 200 may receive a phase component of a signal (e.g., IN) generated by the oscillator 364. The circuit 200 may generate a control signal (e.g., CTR1). The circuit 300 may receive a frequency component (e.g., PLL_CLOCK) of the signal IN generated by the oscillator 364. The circuit 300 may generate a control signal (e.g., CTR2).

The circuit 360 may be implemented as a control circuit. In one example, the block 360 may be implemented as a software block. The block 360 may be used to store appropriate code for executing the steps of FIG. 1. In another example, the block 360 may be implemented as a control logic circuit having a number of gates configured to implement the steps of FIG. 1. The circuit 362 may be implemented as a phase lock loop circuit. The oscillator 352 generates the signal PHASE_ERROR presented to the circuit 200 and the signal PLL_CLOCK presented to the circuit 356. The circuit 200 normally checks for a phase lock. The circuit 300 normally checks for a frequency lock. If both a phase lock and a frequency lock are present, the circuit 306 generates the signal COMP.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) to meet the design criteria of a particular implementation. Additionally, inverters may be added to change a particular polarity of the signals.

The function performed by the flow diagram of FIG. 1 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for detecting a media type of an optical disc, comprising the steps of:
(A) performing an initial read of said optical disc to check for a first phase lock and a first frequency match of a first wobble signal associated with a first media type compared to a first starting frequency, wherein (i) said optical disc comprises a plurality of locations where a read head can be located, (ii) said initial read occurs at any of said plurality of locations, (iii) said initial read occurs prior to any movement of said read head between said plurality of locations, and (iv) said initial read is used to determine whether said optical disc is said first media type or a second media type prior to any movement of said read head;
(B) if step (A) detects said first wobble signal, operating said optical disc as said first media type;
(C) checking for a second phase lock and a second frequency match of a second wobble signal associated with said second media type compared to a second starting frequency; and
(D) if step (C) detects said second wobble signal, operating said optical disc as said second media type.

2. The method according to claim 1, further comprising the step of:
if both step (A) and step (C) fail to phase lock and frequency match, operating said optical disc as a third media type.

3. The method according to claim 2, wherein said third media type comprises a DVD-ROM media type.

4. The method according to claim 2, wherein said third media type comprises an unknown media type.

5. The method according to claim 1, wherein said first media type comprises a DVD+ media type and said second media type comprises a DVD− media type.

6. The method according to claim 1, wherein said plurality of locations comprises a location on said optical disc where said read head is set to read prior to step (A).

7. The method according to claim 1, wherein steps (A)-(D) are performed during a spin up process of said optical disc.

8. The method according to claim 1, wherein said first media type is selected from the group consisting of a DVD+ media type, a DVD− media type, a DVD-RAM media type, a CD-R media type and a CD-RW media type.

9. The method according to claim 1, wherein step (A) is implemented by checking whether a phase lock loop circuit is locked to said first wobble signal.

10. The method according to claim 9, further comprising the step of:
generating a first control signal that causes said phase lock loop circuit to start oscillating at said first starting frequency.

11. The method according to claim 1, wherein step (C) is implemented by checking whether a phase lock loop circuit is locked to said second wobble signal.

12. An apparatus comprising:
a first circuit configured to (a) perform an initial read of an optical disc, wherein (i) said optical disc comprises a plurality of locations where a read head can be located, (ii) said initial read occurs at any of said plurality of locations, (iii) said initial read occurs prior to any movement of said read head between said plurality of locations, and (iv) said initial read is used to determine whether said optical disc is a first media type or a second media type prior to any movement of said read head and (b) generate a first signal oscillating at a first frequency in response to a first control signal;
a lock circuit configured to generate a second control signal in response to said first signal, said second control signal being asserted while said lock circuit is phase locked to said first signal and deasserted otherwise;
a frequency circuit configured to generate a third control signal in response to said first signal, said third control signal being asserted while said first signal is proximate a start up frequency and deasserted otherwise; and
a control block configured to generate (i) said first control signal and (ii) a configuration signal in response to assertion of both said second and said third control signals, wherein said configuration signal indicates a particular media type present on said optical disc.

13. The apparatus according to claim 12, wherein said frequency circuit comprises:
   a counter circuit configured to count a frequency of said first signal; and
   a compare circuit configured to compare said count from said counter circuit to said start up frequency.

14. The apparatus according to claim 12, further comprising a gate circuit coupled between (i) a first output of said lock circuit and a second output of said frequency circuit, and (ii) an input of said control block.

15. The apparatus according to claim 12, wherein said control block is implemented in hardware in one configuration and software in another configuration.

16. The apparatus according to claim 12, wherein said lock circuit comprises:
   a compare generation circuit configured to generate (A) a first compare signal in response to (i) said first signal and (ii) a reference clock signal having a known frequency and (B) a second compare signal in response to (i) said first compare signal and (ii) said reference clock signal; and
   an output circuit configured to generate a lock signal in response to said first and said second compare signals, wherein said lock signal indicates whether said first signal is locked with said reference clock signal.

17. The apparatus according to claim 16, wherein said reference clock signal oscillates at a multiple of a wobble frequency of a known media type.

18. The apparatus according to claim 16, wherein said output circuit comprises a hysteresis circuit.

19. The apparatus according to claim 18, wherein said hysteresis circuit filters glitches from said lock signal.

20. An apparatus comprising:
   means for performing an initial read of an optical disc by checking said optical disc for a first phase lock and a first frequency match of a first wobble signal associated with a first media type compared to a first starting frequency, wherein (i) said optical disc comprises a plurality of locations where a read head can be located, (ii) said initial read occurs at any of said plurality of locations, (iii) said initial read occurs prior to any movement of said read head between said plurality of locations, and (iv) said initial read is used to determine whether said optical disc is said first media type or a second media type prior to any movement of said read head;
   means for operating said optical disc as said first media type if said first wobble signal is present;
   means for checking for a second phase lock and a second frequency match of a second wobble signal associated with a second media type compared to a second starting frequency; and
   means for operating said optical disc as said second media type if said second wobble signal is present.

21. The apparatus according to claim 20, further comprising:
   means for operating said optical disc as a third media type if neither said first wobble signal nor said second wobble signal is present.

* * * * *